(12) United States Patent
Steadele et al.

(10) Patent No.: US 11,371,491 B1
(45) Date of Patent: Jun. 28, 2022

(54) SHAPE MEMORY ALLOY ACTIVE HINGE ACTUATOR

(71) Applicant: THE BOEING COMPANY, Chicago, IL (US)

(72) Inventors: Jason D. Steadele, Everett, WA (US); Frederick T. Calkins, Renton, WA (US); Micheal A. Bass, Berkeley, MO (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 17/461,042

(22) Filed: Aug. 30, 2021

(51) Int. Cl.
*F03G 7/06* (2006.01)

(52) U.S. Cl.
CPC .................................. *F03G 7/0614* (2021.08)

(58) Field of Classification Search
CPC ....... F03G 7/065; B64C 9/323; B64C 27/615; B64C 9/32; B64C 13/341
See application file for complete search history.

(56) References Cited

U.S. PATENT DOCUMENTS

| 2005/0198777 A1* | 9/2005 | Mabe ........................ E05D 5/10 16/308 |
| 2009/0212158 A1* | 8/2009 | Mabe ....................... B64C 9/323 244/1 N |
| 2014/0331665 A1* | 11/2014 | Shivashankara .......... B64C 9/32 60/527 |

OTHER PUBLICATIONS

Saes Group, "Introduction to Nitinol," Memry Corporation, dated Dec. 28, 2017, pp. 1-41.

* cited by examiner

*Primary Examiner* — Shafiq Mian
(74) *Attorney, Agent, or Firm* — Patterson + Sheridan, LLP (57) ABSTRACT

Certain aspects of the present disclosure provide an apparatus. The apparatus includes a first hinge element configured to engage and secure to a fixed element; a second hinge element configured to engage and secure to a movable element and to pivot about an axis of rotation defined by a hinge pin passing through at least one bore of the first hinge element and at least one bore of the second hinge element; and a first shape memory alloy element disposed coaxially within a bore of the hinge pin; a first heating element disposed coaxially within the bore of the hinge pin and configured to heat the first shape memory alloy element, wherein the hinge pin includes a first flange configured to engage the first hinge element; and a second flange configured to engage the second hinge element.

20 Claims, 5 Drawing Sheets

SHAPE MEMORY ALLOY ACTIVE HINGE ACTUATOR

FIELD

This disclosure relates generally to actuation systems for controlling the positioning of a movable element.

BACKGROUND

All sort of systems include controllable movable elements. For example, a moveable element may include a door or a cover, such as an air inlet door, of an aircraft. Keeping with this example, conventional actuation systems for controlling a position of an air inlet door use complex combinations of actuators, motors, linkages, bearings, brackets, and fasteners. For example, an air inlet door may be opened and closed using a linear actuator, a bell crank, linkages, and brackets. A bracket connects the linear actuator to the aircraft and the bell crank changes linear motion of the actuator into rotational motion. The torque tube and support bearings transmit the rotational motion to the linkages. The linkages connect the torque tube to the air inlet door through a bracket. Thus, conventional actuation systems have many moving parts to accomplish a simple task of opening a movable element. The amount of moving parts results in increased design complexity, increased maintenance, increased weight, increased power requirements, and increased opportunities for a fault in one or more of the components.

Accordingly, there is a need for an improved actuation system that can control the position of a movable element, such as an air inlet door, using fewer components.

SUMMARY

Certain embodiments provide an apparatus. The apparatus comprises a first hinge element configured to engage and secure to a fixed element; a second hinge element configured to engage and secure to a movable element and to pivot about an axis of rotation defined by a hinge pin passing through at least one bore of the first hinge element and at least one bore of the second hinge element; and a first shape memory alloy element disposed coaxially within a bore of the hinge pin; a first heating element disposed coaxially within the bore of the hinge pin and configured to heat the first shape memory alloy element, wherein the hinge pin comprises a first flange configured to engage the first hinge element; and a second flange configured to engage the second hinge element.

Other aspects provide a movable element actuation system. The movable element actuation system comprises a movable element; and a hinge actuator, wherein the hinge actuator comprises a first hinge element configured to engage and secure to a fixed element; a second hinge element configured to engage and secure to the movable element and to pivot about an axis of rotation defined by a hinge pin passing through at least one bore of the first hinge element and at least one bore of the second hinge element; and a first shape memory alloy element disposed coaxially within a bore of the hinge pin; and a first heating element disposed coaxially within the bore of the hinge pin and configured to heat the first shape memory alloy element, wherein the hinge pin comprises a first flange configured to engage the first hinge element; and a second flange configured to engage the second hinge element.

Other aspects provide a method of controlling a position of a movable element. The method comprises heating a first shape memory alloy element of a hinge actuator with a first heating element, wherein the hinge actuator comprises a first hinge element configured to engage and secure to a fixed element; a second hinge element configured to engage and secure to the movable element and to pivot about an axis of rotation defined by a hinge pin passing through at least one bore of the first hinge element and at least one bore of the second hinge element, wherein the first shape memory alloy element is disposed coaxially within a bore of the hinge pin; and the first heating element is disposed coaxially within the bore of the hinge pin; pivoting the second hinge element about an axis of rotation defined by the hinge pin; and moving the movable element connected to the hinge actuator.

Other aspects provide processing systems configured to perform the aforementioned method as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide improved actuation systems for controlling a position of a movable element. Such systems may be used in a wide variety of contexts, such as to control the position of a door on a vehicle, such as an air inlet door on an aircraft. Aspects described herein are generally described with respect to controlling air inlet doors on aircraft, but the actuation systems described herein are more broadly applicable. For example, the actuation systems described herein may be used in many types of vehicles, such as aircraft, watercraft, trains, and busses, as well as in structures, such as residential and commercial buildings, factories, and others.

The actuation systems described herein may include a shape memory alloy (SMA) element. The SMA element may be used to provide a torque to a hinge actuator to open a movable element, such as an air inlet door on an aircraft. Generally, SMAs are alloys that deform based on temperature in a predictable and reversible manner. For example, an object made of an SMA can start at an initial shape at an initial temperature, deform from the initial shape to another shape at a second temperature, and then return to the initial shape when returned to the initial temperature. Further, the transitions in SMA objects may include a hysteretic relationship between temperature and shape.

Generally, the reversible shape change process results from a reversible solid-state phase transformation that is induced by applied stress or a change in temperature. For example, the object made of the SMA (e.g., the SMA element) undergoes a martensitic transformation between a parent (e.g., austenite) phase and a martensite phase. The martensitic transformation is a diffusionless process where the crystalline structure of the SMA changes without long-range diffusion of atoms. Instead, the crystalline structure in a martensitic transformation is one where the atoms move in a cooperative, homogenous movement. The phase transformation of a martensitic transformation is one of a shear or shuffle of the crystalline structure, where the atoms typically move less than interatomic distances between the atoms, and movement occurs through twinning of the crystalline lattice.

The martensitic transformation may be from an austenite phase to a martensite phase or a martensite phase to an austenite phase. For example, the SMA element may start with an initial shape in an austenite phase and be cooled to a martensite start temperature, where the SMA element begins its phase and shape transformation. Once the SMA element is at or below a martensite finish temperature, the SMA element is in the martensite phase and its shape may be fully deformed. The transformation from the austenite to the martensite phases may be referenced in relation to a martensite volume fraction (MVF). The MVF is a percentage of the martensite phase, where the SMA element has an MVF of 0% when in the austenite phase, an MVF of 100% when in the martensite phase, and an MVF between 0-100% when transforming between the austenite and martensite phases. When in the martensite phase, the SMA element may be heated to an austenite start temperature, where the SMA element begins to change shape as the temperature increases to the austenite finish temperature. The MVF is between 0-100% when the SMA element is changing shape. Once the SMA element is at or above the austenite finish temperature, the SMA element is in the austenite phase, where the SMA element has an MVF of 0% and is returned to the initial shape. Thus, the shape of the SMA element is a function of the MVF. The reversible shape change process between the austenite and martensite phases results in a shape memory effect that may be useful for creating actuators, such as a hinge actuator for an air inlet door as described in various examples herein.

In some implementations, the SMA element of the hinge actuator is deformed to a martensite phase when the air inlet door is in a neutral position, such as when the door is closed. The SMA element may be transformed to the austenite phase using a heating element to heat the SMA element, such as when the air inlet door is in a fully open position. Thus, the phase transformation of the SMA element may be used to actuate the hinge actuator and open the air inlet door.

In some implementations, the SMA element is partially transformed by holding the SMA element at an intermediate temperature that is between the martensitic finish temperature and the austenite finish temperature. For example, the SMA element may have an MVF between 0-100%. The partially transformed SMA element results in an intermediate shape that is between shapes of the martensitic and the austenite finish temperatures (e.g., the initial shape at the initial temperature and the another shape at the second temperature). Thus, the hinge actuator may move the air inlet door from a closed or neutral position to a partially open position between the closed position and the fully open position. The hinge actuator may be further actuated to the fully open position using the heating element to heat the SMA element to a set temperature (e.g., the austenite finish temperature). Thus, the intermediate shape of the SMA element beneficially allows the hinge actuator to position the air inlet door at a plurality of set positions. The air inlet door may allow more air to flow through as it is further opened. For example, no air may flow through when the door is closed. The maximum amount of air may flow through when the door is in the fully open position. An amount of air less than the amount in the fully open position may flow through at an intermediate position (referred to as partially open). Thus, the heating element and the SMA element may be used to control the position of the air inlet door and to regulate the air flow through the door, which may be used by a control system for controlling a related system operation, such as the cooling of some component, or in a gas generator system (e.g., a nitrogen generator system on an aircraft).

Unlike actuation systems for controlling a position of a movable element, the improved SMA-based actuation systems described herein beneficially reduce weight and complexity of existing systems. Further, because the improved actuation system may be quite compact, they can be installed in locations where conventional actuation systems may not fit.

Example Actuation System for Controlling a Position of a Movable Element

Figure 1:
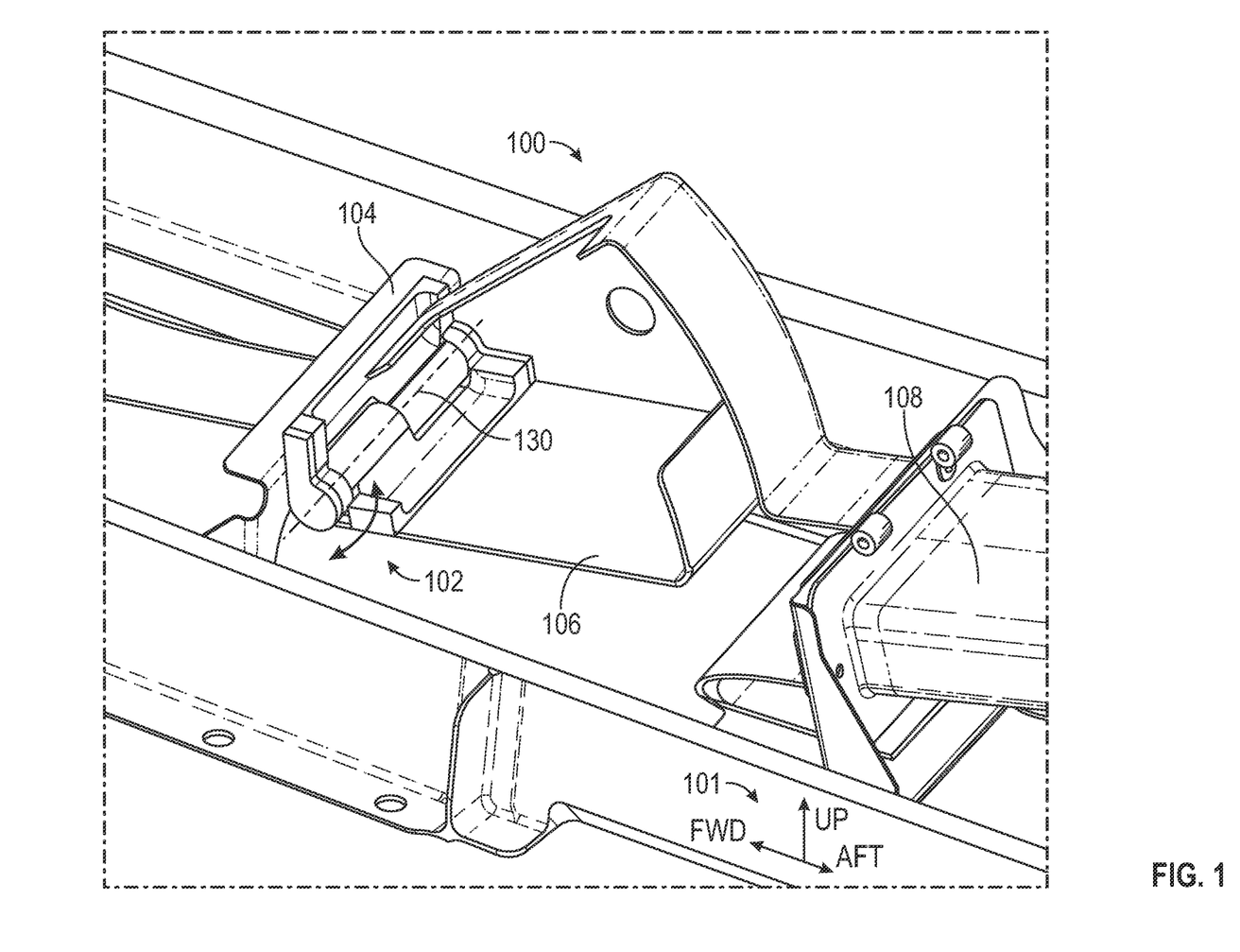
FIG. 1 depicts an actuation system for controlling a position of a movable element, according to an example of the present disclosure.

FIG. 1 depicts an actuation system 100 for controlling a position of a movable element, according to an example of the present disclosure.

The actuation system 100 includes a shape memory alloy (SMA) hinge actuator 102 connected to the movable element and a fixed element. The hinge actuator 102 is configured to move or actuate the movable element to a plurality of different set positions. As shown, in this example, the movable element is an air inlet door 106 of an aircraft system that allows ambient air from outside the aircraft to flow past the air inlet door 106 and into a channel 108 as the aircraft moves in a forward direction (as shown in relation to the coordinate system 101). The hinge actuator 102 is configured to pivot about an axis of rotation 130 as it moves the air inlet door 106. For example, a portion of the hinge actuator 102 rotates counter-clockwise (as shown on the paper) to move the air inlet door 106 to an open position and allow more air to flow into the channel 108 as discussed in relation to FIG. 2. The same portion of the hinge actuator 102 rotates clockwise to move the air inlet door 106 to the neutral position and restrict the amount of air flow into the channel 108. The hinge actuator 102 is secured to the fixed element, such as a fixed bracket 104 of the aircraft. The fixed bracket 104 is fixed in relation to the aircraft and provides an anchor point to fix the hinge actuator 102 as it moves the air inlet door 106. For example, a different portion of the hinge actuator 102 remains fixed in relation to the fixed bracket 104 as the hinge actuator 102 moves the air inlet door 106 as discussed in relation to FIG. 2.

The hinge actuator 102 beneficially uses fewer parts than conventional systems for actuating an air inlet door. For example, the hinge actuator 102 does not require any linkages, torque tubes, or bell cranks to move the air inlet door. Thus, the hinge actuator 102 beneficially reduces weight and complexity of existing conventional systems. Further, the hinge actuator 102 can be installed in locations where conventional actuation systems may not fit because the hinge actuator 102 is more compact than conventional systems.

In some embodiments, the aircraft system is a nitrogen generation system (NGS) and the air inlet door 106 is a ram inlet door of the NGS. The ram inlet door allows ambient air to enter the NGS and cool bleed air from an engine before the bleed air is used in the NGS. For example, the ambient air may flow through the channel 108 to a heat exchanger configured to cool bleed air from the engine. The flow of ambient air, and thus the amount of cooling, is controlled by the position of the ram inlet door. For example, the more the ram inlet door is opened, the more cool ambient air enters the NGS and cools the bleed air.

Examples of Hinge Actuators with a Shape Memory Alloy Element

Figure 2:
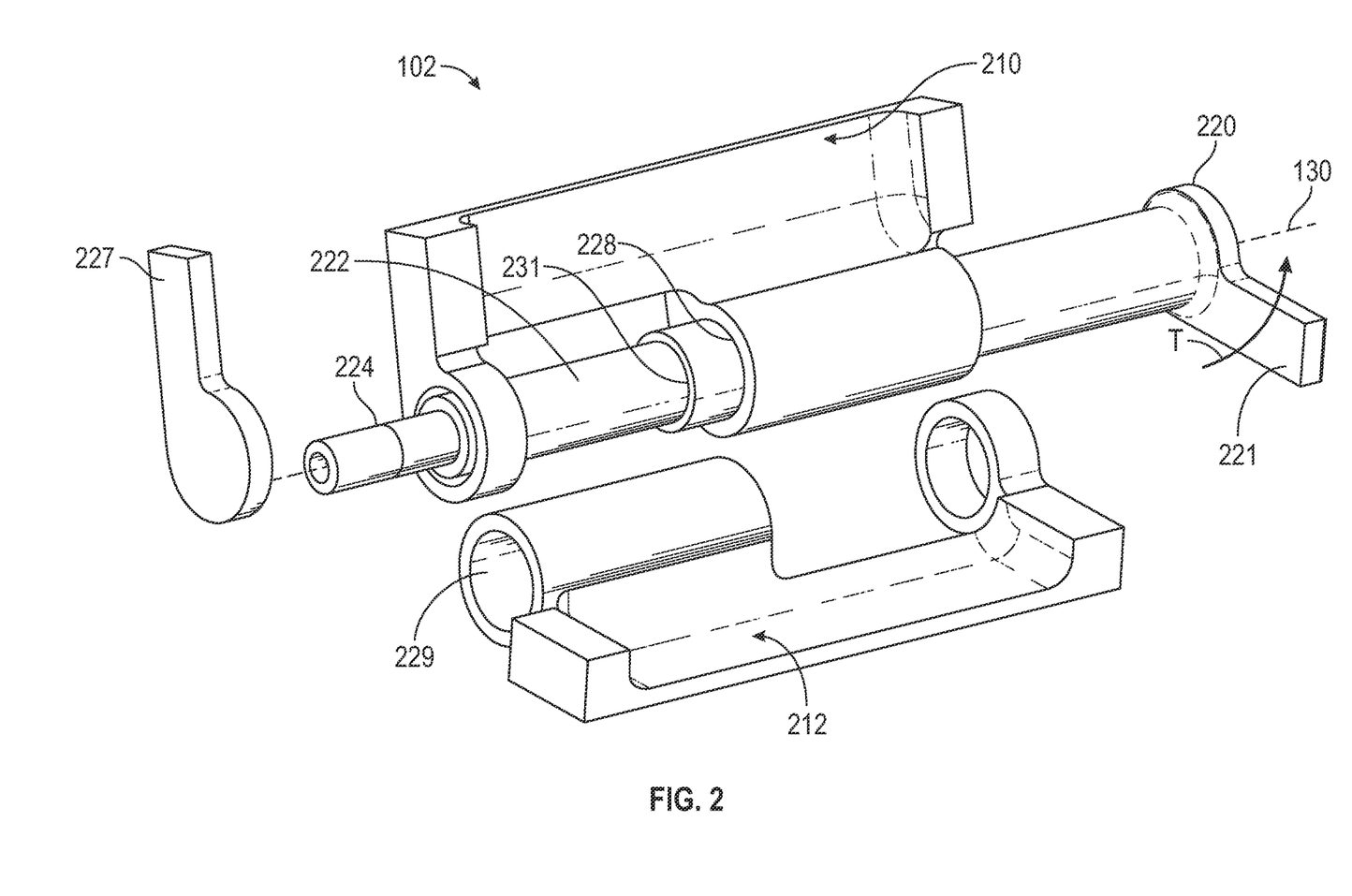
FIG. 2 depicts an exploded isometric view of a hinge actuator, according to another example of the present disclosure.

FIG. 2 depicts an exploded isometric view of the hinge actuator 102, according to another example of the present disclosure.

The hinge actuator 102 includes several components. As shown, the hinge actuator 102 includes a first hinge element 210, a second hinge element 212, and a hinge pin 220 that rotatably couples the hinge elements 210 and 212. The hinge elements 210 and 212 each include at least one bore. For example, the first hinge element 210 and the second hinge element 212 include a first hinge bore 228 and a second hinge bore 229, respectively. The hinge pin 220 passes through the bores 228 and 229 and defines an axis of rotation 130 about which the second hinge element 212 may rotate. The hinge pin 220 comprises a first flange 227 and a second flange 221 that are configured to engage the first hinge element 210 and the second hinge element 212, respectively. In the depicted embodiment, the first flange 227 is detached from the hinge pin 220 and the second flange 221 is integral with the hinge pin 220. The detached first flange 227 remains attached to the first hinge element 210 while the hinge pin 220 and the second flange 221 rotate with the second hinge element 212.

The hinge elements 210 and 212 generally interface with a fixed element and a movable element to control the actuation of the moveable element. For example, hinge elements 210 and 212 may interface with different components of an aircraft, such as the components described in relation to FIG. 1. In particular, the first hinge element 210 may be configured to engage and secure to the fixed bracket 104 and the second hinge element 212 may be configured to engage and secure to the air inlet door 106. The second hinge element 212 may be further configured to pivot about the axis of rotation 130 of the hinge pin 220 and move the air inlet door 106 while the first hinge element 210 remains fixed to the fixed bracket 104. Thus, the first flange 227 of the hinge pin 220 is fixed with the first hinge element 210 and the second flange 221 and the rest of the hinge pin 220 move with the second hinge element 212.

The hinge actuator 102 further includes an SMA element 224 and a heating element 222. The SMA element 224 and the heating element 222 are disposed coaxially within a bore of the hinge pin 220, such as a hinge pin bore 231. The SMA element 224 is configured to apply a torque (T) to the hinge pin 220 and to the second hinge element 212 via the second flange 221. For example, the SMA element 224 is secured to the hinge pin 220 at a second end of the SMA element 224, which may be at or near the second flange 221, and attaches to the first flange 227 at a first end. The heating element 222 heats the SMA element 224 and causes the SMA element 224 to change shape creating a differential twist as it is heated. As the SMA element 224 changes shape, the second end of the SMA element 224 rotates about the axis of rotation 130. The first end of the SMA element 224 is fixed with the first flange 227 and therefore does not rotate. The rotation of the second end is transferred to the hinge pin 220 and the second flange 221 by applying a torque. Thus, the heating element 222 causes the SMA element 224 to transform and apply a torque to the second flange 221 of the hinge pin 220. The second flange 221 applies the torque to the second hinge element 212 in a first direction (e.g., counterclockwise as shown on the paper) to pivot the second hinge element 212 about the axis of rotation 130 of the hinge pin 220 and move the air inlet door 106 to an open position.

The SMA element 224 changes shape through a martensitic transformation, where the SMA element 224 transforms from a martensite phase to an austenite phase as it is heated. When in the martensite phase, the SMA element 224 is configured to position the air inlet door 106 in a neutral or closed position. When in the austenite phase, the SMA element 224 is configured to position the air inlet door 106 in an open position (e.g., a fully open position). A shape of the SMA element 224 is known as its initial shape while it is in the austenite phase. The SMA element 224 is deformed from its initial shape when in the martensite phase and the air inlet door 106 is in the closed or neutral position. For example, the SMA element 224 may be deformed by manual means, such as through manipulation of the hinge actuator 102 by a user, by a force (e.g., weight) exerted from a connected element (e.g., the air inlet door 106), or through an actuation mechanism. The heating element 222 is configured to heat the SMA element 224 and transform the SMA element 224 to its initial shape. In the depicted embodiment, the heating element 222 heats the SMA element 224 to an austenite start temperature required to transform the SMA element 224 to its initial shape in the austenite phase. Thus, the heating element 222 is used to position the air inlet door 106 in open position.

In some embodiments, the configuration of the SMA element 224 may be different. For example, the SMA element 224 may be configured to position the air inlet door 106 in an open position when in the martensite phase. When heated, the SMA element 224 may transform to its initial shape in the austenite phase and position the air inlet door 106 in the closed position.

In some embodiments, the martensitic transformation of the SMA element 224 includes intermediate shapes. For example, the SMA element 224 may have a plurality of intermediate shapes between the martensitic and austenitic phases. The plurality of intermediate shapes may be referenced in relation to a martensite volume fraction (MVF) as previously discussed above. Each intermediate shape of the plurality of intermediate shapes corresponds to a different partially open position of the second hinge element 212 and the air inlet door 106. Thus, the intermediate shapes may be used to move or actuate the air inlet door 106 to a plurality of different positions between the neutral position corresponding to the martensite phase and the open position corresponding to the austenite phase. The heating element 222 controls the phase of the SMA element 224. In some embodiments, the heating element 222 transforms the SMA element 224 to the plurality of intermediate shapes by heating the SMA element 224 to a temperature between the austenite start temperature and an austenite finish temperature as previously discussed above. The heating element 222 controls the air flow through the air inlet door 106. For example, as the temperature of the SMA element 224 increases to the austenite finish temperature, an opening formed by the air inlet door 106 increases and allows more air to flow through the opening. Thus, the plurality of intermediate shapes may be used to control the air flow through the air inlet door 106.

In some embodiments, the hinge actuator 102 further comprises a locking mechanism configured to lock the second hinge element 212 in one or more fixed positions. The locking mechanism may be used to provide positional dwell or locking of the hinge actuator 102. For example, the locking mechanism may include at least one pawl assembly configured to engage teeth of a cogwheel or ratchet (referred to as a pawl assembly). The pawl assembly is configured to engage the hinge actuator 102 or air inlet door 106 and hold the air inlet door 106 in a position. In some embodiments, the locking mechanism may be configured to lock and hold the position of the hinge actuator 102 and air inlet door 106 at each position of the plurality of positions as the SMA element 224 transforms from the martensite phase to the austenite phase. The phase transformation may include intermediate phases corresponding to different partially open positions of the air inlet door 106 as previously discussed. In some embodiments, the locking mechanism may provide a positional stop at each position of the plurality of positions such that the second hinge element 212 of the hinge actuator 102 may move to further open the air inlet door 106 but cannot move to close the air inlet door 106 unless the pawls assembly is disengaged. In some embodiments, the pawls assembly includes an actuator (referred to as a pawls actuator) to engage and disengage the pawls from the cogwheel or ratchet. Thus, the pawls assembly beneficially allows the hinge actuator 102 to hold the position of the air inlet door 106 without having to use the heating element 222 to constantly heat the SMA element 224. The pawls assembly further allows the position of the air inlet door 106 to be held while the air inlet door 106 is subjected to loads such as aerodynamic loads.

Figure 6:
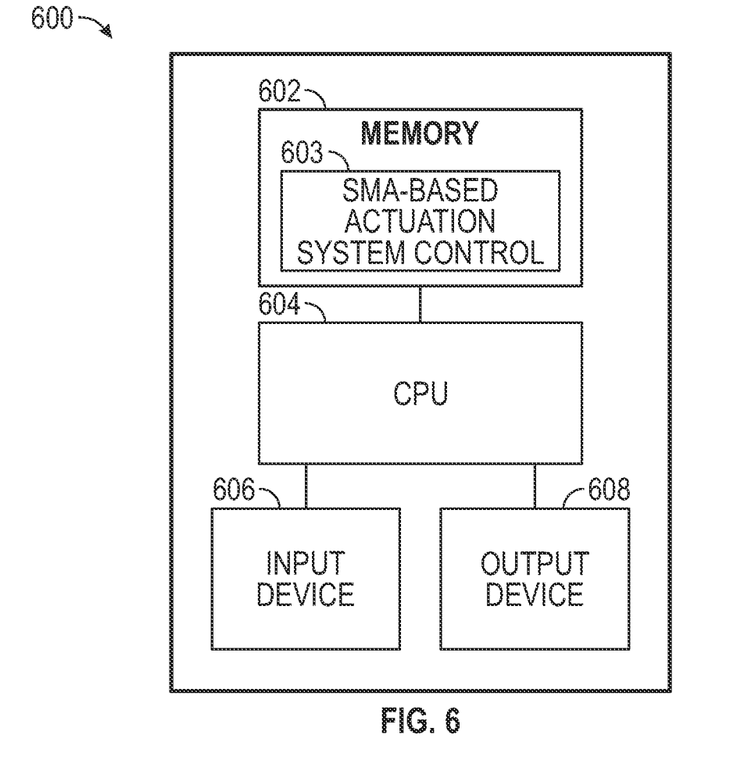
FIG. 6 depicts a schematic view of an example system controller that can be used according to the systems and methods described herein.

Some embodiments further include a sensor configured to measure a rotation angle of the second hinge element 212 relative to the first hinge element 210 as described in relation to FIG. 6. The sensor may be a position sensor such as an encoder or angular sensor to sense a position or angle of the second hinge element 212 or of the air inlet door 106. The position sensor may be part of the hinge actuator 102 or mounted to the air inlet door 106.

Some embodiments further include a temperature sensor such as a thermocouple to sense a temperature of the SMA element 224, the heating element 222, or of another system that actuation system 100 (as described in relation to FIG. 1) interfaces with, such as the NGS. The temperature sensor may be part of the hinge actuator 102 or mounted to the SMA element 224 or the heating element 222. The temperature sensor may also be placed in a different location, for example, in an engine bleed air stream after the bleed air is cooled by air flowing past the air inlet door 106. This beneficially allows the position of the air inlet door 106 to be controlled based on the temperature of the cooled bleed air.

Some embodiments further include a controller configured to control the heating element 222. In some embodiments, the position and temperature sensors may interface with the controller, such as a system controller 600 as described in relation to FIG. 6, to control the position of second hinge element 212 or of the air inlet door 106. For example, the system controller may control the temperature of the SMA element 224 by controlling the heat outputted by the heating element 222, and thus control the position or rotation of the air inlet door 106, using data from the position or temperature sensors. Data from the position or temperature sensors can be used to form a control feedback loop, such as may be implemented by the control system of FIG. 6. The system controller may further interface with the pawls assembly to control the position of the second hinge element 212 or of the air inlet door 106. For example, the system controller may interface with the pawls actuator to engage or disengage the pawls assembly to provide positional dwell or locking of the hinge actuator 102.

In some embodiments, the hinge actuator 102 may be available in a variety of different sizes and configurations. For example, the hinge actuator 102 may be available in a variety of standard sizes (e.g., lengths) to interface with different systems. The hinge actuator 102 may be available in different configurations (e.g., using different SMA elements 224 or heating elements 222) to provide a variety of standard degrees of rotation.

In some embodiments, the SMA comprises nickel and titanium. In some embodiments, the SMA further comprises at least one of hafnium, zirconium, or gold. In some embodiments, the SMA is Nitinol. In some embodiments, the alloy composition is chosen based on the how the SMA is used. For example, the alloy combination may be selected based on desired shape memory properties such as an amount of rotation provided to the hinge actuator 102 when transforming between the martensite and austenite phases, torque provided to the hinge actuator 102 during phase transformations, and mechanical properties such as elastic modulus and yield stress, abrasion and corrosion resistance, and the like.

In some embodiments, the SMA element 224 is a shaped like a spring (referred to as an SMA spring). In some embodiments, when the air inlet door 106 is in a neutral position, the SMA spring is in the martensitic phase and the SMA spring is uncoiled. Heating the SMA spring causes it to "coil up" or recoil as it transforms to the austenite phase. The SMA spring applies a torque to the first flange 227 as it recoils, which moves the air inlet door 106.

In some embodiments, the first flange 227 may be referred to as a hinge pin keeper that includes a first flange configured to engage the first hinge element 210. The hinge pin keeper is part of the hinge pin 220 but may be a distinct and separate body from the rest of the hinge pin 220.

Although the first hinge element 210 is described as fixed, the first hinge element 210 may be movable in other embodiments. For example, the first hinge element 210 may be secured to a movable element and the second hinge element 212 may be secured to a fixed element. Additionally, each hinge element 210 and 212 may be secured to a movable element. For example, the first hinge element 210 may be secured to a first movable element having an adjustable position. The second hinge element 212 may be secured a second movable element having a controllable position, such as the air inlet door 106.

As previously discussed, the hinge actuator 102 may use the SMA element 224 to control the position of an air inlet door 106. In particular, the hinge actuator 102 may use the SMA element 224 to apply a torque in a first direction to move the air inlet door 106 to a plurality of different set positions. Other embodiments of a hinge actuator may use additional components, such as additional SMA elements, to allow finer control of the position of the air inlet door 106 (or other movable elements in other embodiments). For example, a second SMA element may be used to apply a torque in a second direction that opposes the first direction as described in relation to FIG. 3. This beneficially provides an additional input to allow the hinge actuator to control the position of the air inlet door 106 with even more precision.

Examples of Hinge Actuators with Multiple Shape Memory Alloy Elements

Figure 3:
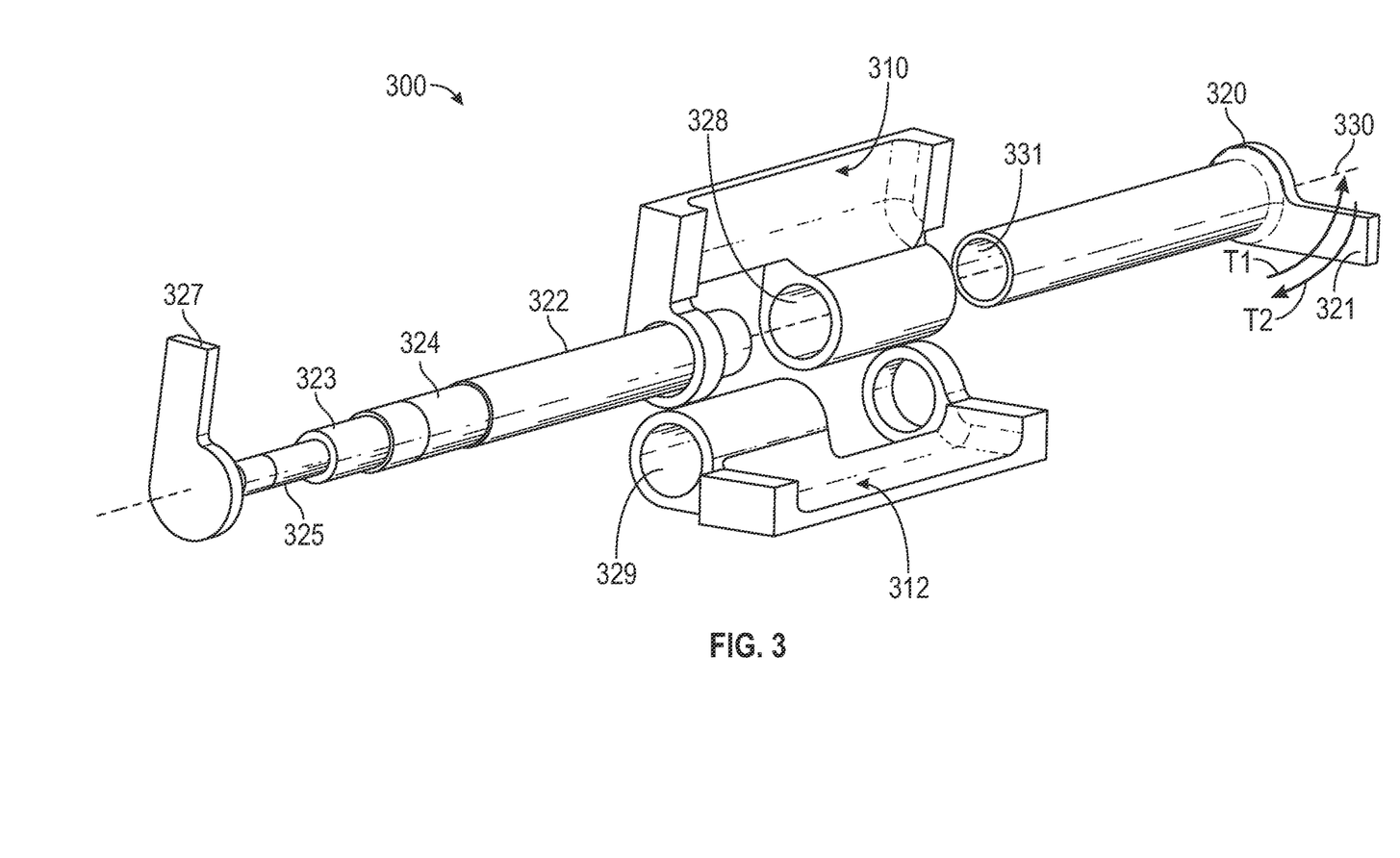
FIG. 3 depicts an exploded isometric view of a different hinge actuator, according to another example of the present disclosure.

FIG. 3 depicts an exploded isometric view of a different hinge actuator 300, according to another example of the present disclosure. The hinge actuator 300 is similar to the hinge actuator 102 discussed in relation to FIG. 2, except the hinge actuator 300 includes more than one SMA element and more than one heating element. For example, the hinge actuator 300 includes a first hinge element 310 and a second hinge element 312. A hinge pin 320 passes through a first hinge bore 328 and a second hinge bore 329 of the hinge elements 310 and 312, respectively. The hinge pin 320 defines an axis of rotation 330 about which the second hinge element 312 rotates. The hinge pin 320 includes a first flange 327 and a second flange 321 configured to engage to the hinge elements 310 and 312, respectively.

The hinge actuator 300 differs from the hinge actuator 102 in that the hinge actuator 300 includes more than one SMA element and more than one heating element disposed in a bore of the hinge pin 320. For example, a first SMA element 324 and a first heating element 322 are disposed coaxially within a bore of the hinge pin 320, such as a hinge pin bore 331. A second SMA element 325 and a second heating element 323 are also disposed coaxially within the hinge pin bore 231. The SMA elements 324 and 325 may each be secured to the hinge pin 320 at a second end, which may be at or near the second flange 321. Each SMA element 324 and 325 attaches to the first flange 327 at a first end.

The heating elements 322 and 323 are configured to heat the SMA elements 324 and 325, respectively. When heated, the first SMA element 324 is configured to apply a torque (T1) to the second flange 321 of the hinge pin 320 in a first direction to move the air inlet door 106 to an open position. The first heating element 322 and the first SMA element 324 move the air inlet door 106 similar to as described in relation to the heating element 222 and the SMA element 224 in FIG. 2. When heated, the second SMA element 325 is configured to apply a torque (T2) to the second flange 321 of the hinge pin 320 in a second direction to further adjust the position of the air inlet door 106. The second SMA element 325 operates similar to the first SMA element 324, except the torque in the second direction is opposite the torque in the first direction. For example, the torque in the first direction may rotate the hinge pin 320 and the second hinge 312 counter-clockwise (as shown on the paper) to open the air inlet door 106 and the torque in the second direction may rotate the hinge pin 320 and the second hinge 312 clockwise to close the air inlet door 106.

In some embodiments, the SMA elements 324 and 325 are configured to operate at different temperatures. For example, the first SMA element 324 may transform to an austenite phase at a first austenite start temperature and a first austenite finish temperature, and the second SMA element 325 may transform to an austenite phase at a second austenite start temperature and a second austenite finish temperature. The different temperatures (e.g., the first and second austenite start and finish temperatures) required to transform the SMA elements 324 and 325 may result from differences in the SMA elements 324 and 325. For example, the first SMA element 324 may comprise a different material composition or a different atomic or weight percent of materials than the second SMA element 325. The different material configurations of the SMA elements 324 and 325 may result in a different austenite start and/or finish temperature required to transform each SMA element 324 and 325 to the austenite phase. The SMA elements 324 and 325 may be thermally insulated from another, which beneficially allows each SMA element 324 and 325 to be heated to the first and second temperatures, respectively, without interfering with another. For example, the first heating element 322 may heat the first SMA element 324 to a first temperature to open the air inlet door 106 and allow air to flow through the air inlet door 106. The first temperature may be between the first austenite start temperature and the first austenite finish temperature. When the air flow is no longer needed, the first heating element 322 may be turned off and the second heating element 323 may heat the second SMA element 325 to a second temperature to close the air inlet door 106 and stop the flow of air. The second temperature may be between the second austenite start temperature and the second austenite finish temperature. Thus, the SMA elements 324 and 325 may be used to independently control the position of the air inlet door 106.

In some embodiments, the torque in the first direction and the torque in the second direction (referred to as the torques) may work together to move the air inlet door 106 to a desired position of a plurality of set positions. For example, the first SMA element 324 may apply the torque in the first direction to move the air inlet door 106 towards a fully open position. When at or near the desired set position of the plurality of set positions, such as at a partially open position, the second SMA element 325 may apply the torque in the second direction. The torque in the second direction may be equal to but opposite of the torque in the first direction and may be used to stop movement of and hold the position of the air inlet door 106. The hinge actuator 102 may use the plurality of set positions to control the amount of air flowing past the air inlet door 106.

In some embodiments, the phase transformation of each SMA element 324 and 325 may include intermediate shapes as discussed in relation to FIG. 2. For example, the intermediate shapes of each SMA element 324 and 325 may change with an MVF of each SMA element 324 and 325. The intermediate shapes, and thus the MVF, may be used with the opposing torques to beneficially allow the air inlet door 106 to be set to any one of the plurality of set positions. For example, the heating elements 322 and 323 may operate at the same time and at different temperatures. The temperature of each heating element 322 and 323 may correspond to an intermediate shape and an MVF of each SMA element 324 and 325. The resulting torques are combined to create and apply a net torque to the second flange 321. The net torque may be used to control the position and a rate of change of the position of the air inlet door 106. When the air inlet door 106 is at a desired position of the plurality of set positions, such as a partially open position, the temperature of each SMA element 324 and 325 may be adjusted such that the net torque is zero and the air inlet door 106 remains at the desired position. In some examples, the torques may vary with the temperature of the SMA elements 324 and 325 to beneficially allow finer control of the position of the air inlet door 106.

In some embodiments, the hinge elements 310 and 312 and the hinge pin 320 may be smaller or larger in size than the hinge elements 210 and 212 and the hinge pin 220 discussed in relation to FIG. 2. A larger-sized hinge pin 320 beneficially allows the hinge pin 320 to accommodate more than one SMA element or to accommodate SMA elements of different sizes.

In the depicted embodiment, the heating elements 322 and 323 and the SMA elements 324 and 323 are nested when assembled. For example, the second SMA element 325 fits inside the second heating element 323, which in turn fits inside the first SMA element 324, which in turn fits inside the first heating element 322. Some embodiments include an insulated layer in between the first SMA element 324 and the second heating element 323. The insulated layer beneficially prevents the second heating element 323 from heating the first SMA element 324 and allows independent control of the heating elements 322 and 323.

In some embodiments, the heating elements 322 and 323 may form a core in between the SMA elements 324 and 325. For example, the second heating element 323 may fit inside the first heating element 322 to form a "back-to-back" configuration. The heating elements 322 and 323 may fit inside the first SMA element 324 and the second SMA element 325 may fit inside the second heating element 323. The first heating element 322 may be configured to heat radially outward (e.g., away from the axis of rotation 330) to heat the first SMA element 324 and the second heating element 323 may be configured to heat radially inward (e.g., towards the axis of rotation 330) to heat the second SMA element 325. The heating elements 322 and 323 may be independently controlled. In some embodiments, the back-to-back heating elements 322 and 323 may be part of one heater that fits in between the first and second SMA elements 324 and 325. Thus, the one heater configuration beneficially reduces the number of parts needed in the hinge actuator 102 while allowing independent control of the SMA elements 324 and 325.

As previously discussed, the hinge actuator 300 is similar to the hinge actuator 102 in FIG. 2 and may be configured similarly. For example, in some embodiments, the hinge actuator 300 further comprises a locking mechanism, such as a pawl assembly, configured to lock the second hinge element 212 in one or more fixed positions as described in relation to FIG. 2. Some embodiments may further include a sensor and a controller as described in relation to FIG. 2. The preceding embodiments are a few examples of how the hinge actuator 300 may incorporate features of the hinge actuator 102. Other embodiments and features of the hinge actuator 102 discussed in relation to FIG. 2 may be applied to the hinge actuator 300.

Figure 4A:
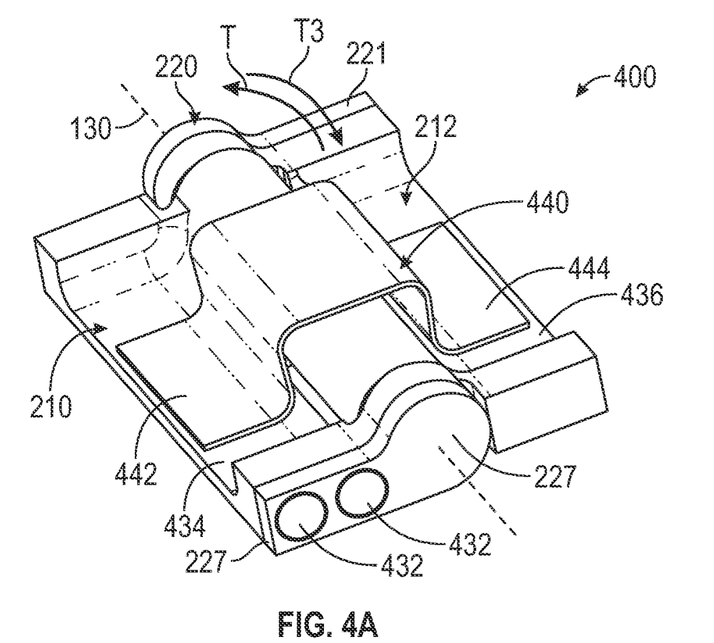
FIGS. 4A and 4B depict isometric views of a different hinge actuator in at-rest and actuated positions, respectively, according to another example of the present disclosure.
Figure 4B:
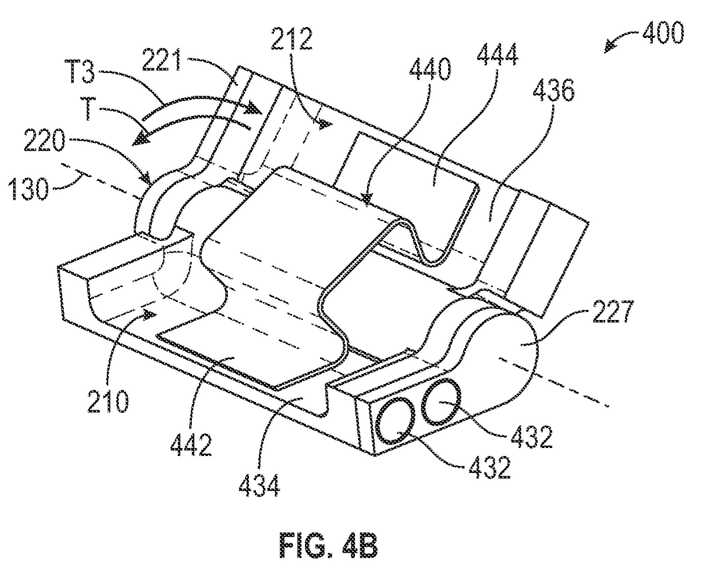

FIGS. 4A and 4B depict an isometric view of a different hinge actuator 400 in an at-rest (FIG. 4A) and an actuated (FIG. 4B) position, respectively, according to another example of the present disclosure. The hinge actuator 400 is similar to the hinge actuator 102 discussed in relation to FIG. 2, except the hinge actuator 400 includes a biasing element (e.g., a spring 440). Thus, the discussion in relation to the components and configurations of the hinge actuator 102 are applicable to the hinge actuator 400.

In the depicted embodiment, the biasing element is attached to the first hinge element 210 and the second hinge element 212. The biasing element is further configured to apply a torque (T3) to the second hinge element 212. The torque applied by the biasing element is in an opposite direction than the torque (T) applied by the SMA element 224 (not shown). For example, the SMA element 224 is configured to apply a torque in a first direction and the biasing element is configured to apply a torque in a second direction opposite the first direction. In the depicted embodiment, the biasing element comprises a first leg 442 and a second leg 444. The first leg 442 attaches to an inner surface 434 of the first hinge element 210 and the second leg 444 attaches to an inner surface 436 of the second hinge element 212. The legs 442 and 444 of the biasing element are configured to apply the torque in the second direction to the second hinge element 212.

In some embodiments, the biasing element comprises a spring 440. The spring 440 is biased to apply a torque in the second direction to move the air inlet door 106 to a closed position and retain it in the closed positon. As shown in relation to FIGS. 4A and 4B, the spring 440 is in a neutral position (FIG. 4A) and a loaded position (FIG. 4B). When in a loaded position, the spring 440 applies the torque in the second direction in an attempt to return to the neutral position. The spring 440 may be in the loaded position when the air inlet door 106 is in the closed position, which beneficially biases the air inlet door 106 to the closed position. As the SMA element 224 is heated past the austenite start temperature, the SMA element 224 transforms to the austenite phase and applies a torque in a first direction to overcome the torque of the spring 440 (in the second direction). The torque in the first direction moves the air inlet door 106 to an open position. When the SMA element 224 is no longer heated and a temperature of the SMA element 224 cools below the martensite start temperature, the torque in the second direction overcomes the torque in the first direction and the spring 440 moves the air inlet door 106 to the closed position. Thus, the SMA element 224 may be used to move the air inlet door 106 to an open position and the bias of the spring 440 may be used to move the air inlet door 106 to the closed position.

In some embodiments, the spring 440 may be an SMA element (referred to as an SMA spring). The SMA element 224 and the SMA spring may be configured similarly to the SMA elements 324 and 325 discussed in relation to FIG. 3. For example, the SMA element 224 is configured to apply a torque in a first direction to the second hinge element 212 and the SMA spring is configured to apply a torque in a second direction, which is opposite the first direction, to the second hinge element 212. In such configurations, the biasing element may further comprise a second heating element (not shown) configured to heat the SMA spring past an austenite start temperature of the SMA spring and cause it to apply the torque in the second direction. In one embodiment, the heating element may be a heating pad attached to the biasing element. In another embodiment, the second heating element may apply a current to the SMA spring and heat the SMA spring using Joule heating. Such embodiments may electrically insulate the SMA spring from the rest of the hinge actuator 400. In some embodiments, the second heating element may include a strip heater to heat the SMA spring.

Referring to the air inlet example, the SMA element 224 moves the air inlet door 106 to an open position when heated and transformed to an austenite phase and the SMA spring moves the air inlet door 106 to a closed position when heated and transformed to an austenite phase. FIG. 4A shows the SMA spring in an austenite phase.

In the depicted embodiment, the first flange 227 is configured to engage the first hinge element 210 using bolts 432. In some embodiments, the first flange 227 may be configured to engage to the first hinge element 210 through other means, such as an adhesive or other mounting hardware. The second flange 221 may similarly be configured to engage to the second hinge element 212.

Example Method of Controlling a Position of a Movable Element

Figure 5:
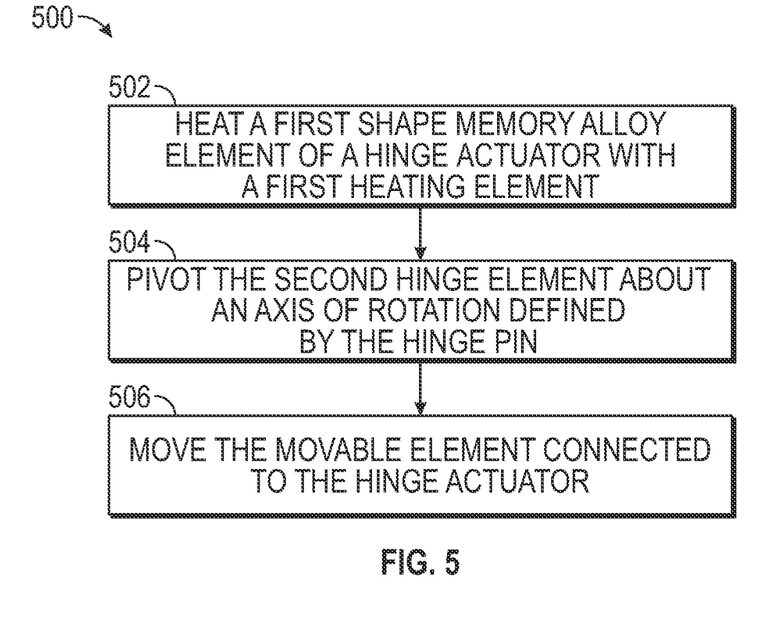
FIG. 5 depicts an example method of controlling a position of a movable element using a hinge actuator, according to another example of the present disclosure.

FIG. 5 depicts an example method of controlling a position of a movable element using a hinge actuator, according to another example of the present disclosure.

Method 500 begins at step 502 with heating a first shape memory alloy element of a hinge actuator with a first heating element, as described above with respect to FIGS. 2-4B. In some embodiments, the hinge actuator includes a first hinge element configured to engage and secure to a fixed element and a second hinge element configured to engage and secure to the movable element and to pivot about an axis of rotation defined by a hinge pin passing through at least one bore of the first hinge element and at least one bore of the second hinge element. In some embodiments, the first shape memory alloy element is disposed coaxially within a bore of the hinge pin, the first heating element is disposed coaxially within the bore of the hinge pin, and the hinge pin comprises a first flange configured to engage the first hinge element and a second flange configured to engage the second hinge element.

Method 500 then proceeds to step 504 with pivoting the second hinge element about an axis of rotation defined by the hinge pin, as described above with respect to FIGS. 2-4B.

Method 500 then proceeds to step 506 with moving the movable element connected to the hinge actuator, as described above with respect to FIGS. 2-4B.

In some embodiments of method 500, when heated by the first heating element, the first shape memory alloy element applies a torque in a first direction to the hinge pin and to the second hinge element via the second flange, as described above with respect to FIGS. 2-4B. Some embodiments further include heating a second shape memory alloy element of the hinge actuator with a second heating element, as described above with respect to FIGS. 3-4B. In some embodiments, the second shape memory alloy element is disposed coaxially within the bore of the hinge pin and the second heating element is disposed coaxially within the bore of the hinge pin. In some embodiments, when heated by the second heating element, the second shape memory alloy element applies a torque in a second direction, opposite the torque in the first direction, to the hinge pin and to the second hinge element via the second flange. Some embodiments further include controlling the first heating element using a controller and measuring a rotation angle of the second hinge element relative to the first hinge element using a sensor.

In some embodiments, the hinge actuator further comprises a biasing element attached to the first hinge element and the second hinge element and the biasing element is configured to apply a torque in a second direction to the second hinge element, opposite the torque in the first direction, as described above with respect to FIGS. 4A and 4B.

In some embodiments, the biasing element comprises a spring. In some embodiments, the biasing element comprises a second shape memory alloy element, and the hinge actuator further comprises a second heating element configured to heat the second shape memory alloy element and cause it to apply the torque in the second direction.

Example Processing System

FIG. 6 depicts a schematic view of an example system controller 600 that can be used according to the systems and methods described herein. The system controller 600 includes a processor 604 (e.g., a central processing unit (CPU)) in data communication with a memory 602, an input device 606, and an output device 608. Although described separately, it is to be appreciated that functional blocks described with respect to the system controller 600 need not be separate structural elements. For example, the processor 604 and memory 602 is embodied in a single chip. The processor 604 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 604 can be coupled, via one or more buses, to read information from or write information to memory 602. The processor may additionally, or in the alternative, contain memory, such as processor registers. The memory 602 can include processor cache, including a multi-level hierarchical cache in which different levels have different capacities and access speeds. The memory 602 can also include random access memory (RAM), other volatile storage devices, or non-volatile storage devices. The storage can include hard drives, flash memory, etc. Memory 602 can also include a computer program product embodied on memory 602 comprising code such as an SMA-based actuation system control application 603, which is used to control the hinge actuator. For example, the SMA-based actuation system control application 603 may include a hinge pin rotation application used to control a rotation of a hinge pin as described in FIGS. 2 and 3. The SMA-based actuation system control application 603 may be code that can be executed by processor 604. In various instances, the memory is referred to as a computer-readable storage medium or a non-transitory computer-readable medium. The computer-readable storage medium is a non-transitory device capable of storing information, and is distinguishable from computer-readable transmission media such as electronic transitory signals capable of carrying information from one location to another. The non-transitory computer readable medium includes computer-executable instructions that, when executed by a processing system, cause the processing system to perform a method, as described in relation to FIGS. 2-5, including heating a first shape memory alloy element of a hinge actuator with a first heating element, wherein the hinge actuator includes a first hinge element, a second hinge element, and a hinge pin passing through at least one bore of the first hinge element and at least one bore of the second hinge element; pivoting the second hinge element about an axis of rotation defined by the hinge pin; and moving a movable element connected to the hinge actuator. Computer-readable medium as described herein may generally refer to a computer-readable storage medium or computer-readable transmission medium.

The processor 604 also may be coupled to an input device 606 and an output device 608 for, respectively, receiving input from and providing output the system controller 600. Suitable input devices include, but are not limited to a video camera (possibly coupled with video processing software to, e.g., detect a position of a movable element, the hinge actuator, or the a second hinge element), an encoder (e.g., an optical or magnetic, capacitive, or inductive encoder), a resolver, a potentiometer, an angle sensor, an accelerometer, a gyroscope, an inertial measurement unit, or a motion detector. The input device 606 includes a position sensor such as an encoder or angle position sensor as discussed in relation to FIG. 2. Suitable output devices include, but are not limited to, the hinge actuator and the SMA elements as discussed in relation to FIGS. 2-5.

Aspects of the present disclosure have been described above with reference to specific embodiments. Persons skilled in the art, however, will understand that various modifications and changes may be made thereto without departing from the broader spirit and scope of the present disclosure as set forth in the appended claims. The foregoing description and drawings are, accordingly, to be regarded in an illustrative rather than a restrictive sense.

Example Clauses

Implementation examples are described in the following numbered clauses:

Clause 1: An apparatus, comprising a first hinge element configured to engage and secure to a fixed element; a second hinge element configured to engage and secure to a movable element and to pivot about an axis of rotation defined by a hinge pin passing through at least one bore of the first hinge element and at least one bore of the second hinge element; and a first shape memory alloy element disposed coaxially within a bore of the hinge pin; a first heating element disposed coaxially within the bore of the hinge pin and configured to heat the first shape memory alloy element, wherein the hinge pin comprises a first flange configured to engage the first hinge element; and a second flange configured to engage the second hinge element.

Clause 2: The apparatus of Clause 1, wherein when heated by the first heating element, the first shape memory alloy element is configured to apply a torque in a first direction to the hinge pin and to the second hinge element via the second flange.

Clause 3: The apparatus of Clause 2, further comprising a second shape memory alloy element disposed coaxially within the bore of the hinge pin; and a second heating element disposed coaxially within the bore of the hinge pin and configured to heat the second shape memory alloy element.

Clause 4: The apparatus of Clause 3, wherein when heated by the second heating element, the second shape memory alloy element is configured to apply a torque in a second direction, opposite the torque in the first direction, to the hinge pin and to the second hinge element via the second flange.

Clause 5: The apparatus of Clause 2, further comprising a biasing element attached to the first hinge element and the second hinge element and configured to apply a torque in a second direction to the second hinge element, opposite the torque in the first direction.

Clause 6: The apparatus of Clause 5, wherein the biasing element comprises a spring.

Clause 7: The apparatus of Clause 5, wherein the biasing element comprises a second shape memory alloy element, and the apparatus further comprises a second heating element configured to heat the second shape memory alloy element and cause it to apply the torque in the second direction.

Clause 8: The apparatus of Clause 2, further comprising a controller configured to control the first heating element; and a sensor configured to measure a rotation angle of the second hinge element relative to the first hinge element.

Clause 9: The apparatus of Clause 1, further comprising a locking mechanism configured to lock the second hinge element in one or more fixed positions.

Clause 10: The apparatus of Clause 1, wherein the movable element comprises an air inlet door of an aircraft system.

Clause 11: The apparatus of Clause 10, wherein the aircraft system comprises a nitrogen generation system.

Clause 12: A movable element actuation system, comprising a movable element; and a hinge actuator, wherein the hinge actuator comprises a first hinge element configured to engage and secure to a fixed element; a second hinge element configured to engage and secure to the movable element and to pivot about an axis of rotation defined by a hinge pin passing through at least one bore of the first hinge element and at least one bore of the second hinge element; and a first shape memory alloy element disposed coaxially within a bore of the hinge pin; and a first heating element disposed coaxially within the bore of the hinge pin and configured to heat the first shape memory alloy element, wherein the hinge pin comprises a first flange configured to engage the first hinge element; and a second flange configured to engage the second hinge element.

Clause 13: A method of controlling a position of a movable element, comprising heating a first shape memory alloy element of a hinge actuator with a first heating element, wherein the hinge actuator comprises a first hinge element configured to engage and secure to a fixed element; a second hinge element configured to engage and secure to the movable element and to pivot about an axis of rotation defined by a hinge pin passing through at least one bore of the first hinge element and at least one bore of the second hinge element, wherein the first shape memory alloy element is disposed coaxially within a bore of the hinge pin, the first heating element is disposed coaxially within the bore of the hinge pin, and the hinge pin comprises a first flange configured to engage the first hinge element and a second flange configured to engage the second hinge element; pivoting the second hinge element about an axis of rotation defined by the hinge pin; and moving the movable element connected to the hinge actuator.

Clause 14: The method of Clause 13, wherein when heated by the first heating element, the first shape memory alloy element applies a torque in a first direction to the hinge pin and to the second hinge element via the second flange.

Clause 15: The method of Clause 14, heating a second shape memory alloy element of the hinge actuator with a second heating element, wherein the second shape memory alloy element is disposed coaxially within the bore of the hinge pin; and the second heating element is disposed coaxially within the bore of the hinge pin.

Clause 16: The method of Clause 15, wherein when heated by the second heating element, the second shape memory alloy element applies a torque in a second direction, opposite the torque in the first direction, to the hinge pin and to the second hinge element via the second flange.

Clause 17: The method of Clause 14, wherein the hinge actuator further comprises a biasing element attached to the first hinge element and the second hinge element and the biasing element is configured to apply a torque in a second direction to the second hinge element, opposite the torque in the first direction.

Clause 18: The method of Clause 17, wherein the biasing element comprises a spring.

Clause 19: The method of Clause 17, wherein the biasing element comprises a second shape memory alloy element, and the hinge actuator further comprises a second heating element configured to heat the second shape memory alloy element and cause it to apply the torque in the second direction.

Clause 20: The method of Clause 14, wherein the hinge actuator further comprises controlling the first heating element using a controller; and measuring a rotation angle of the second hinge element relative to the first hinge element using a sensor.

Clause 21: A processing system, comprising a memory comprising computer-executable instructions; one or more processors configured to execute the computer-executable instructions and cause the processing system to perform a method in accordance with any one of Clauses 13-20.

Clause 22: A processing system, comprising means for performing a method in accordance with any one of Clauses 13-20.

Clause 23: A non-transitory computer-readable medium comprising computer-executable instructions that, when executed by one or more processors of a processing system, cause the processing system to perform a method in accordance with any one of Clauses 13-20.

Clause 24: A computer program product embodied on a computer-readable storage medium comprising code for performing a method in accordance with any one of Clauses 13-20.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus, comprising:
    a first hinge element configured to engage and secure to a fixed element;
    a second hinge element configured to engage and secure to a movable element and to pivot about an axis of rotation defined by a hinge pin passing through at least one bore of the first hinge element and at least one bore of the second hinge element;
    a first shape memory alloy element disposed coaxially within a bore of the hinge pin; and
    a first heating element disposed coaxially within the bore of the hinge pin and configured to heat the first shape memory alloy element, wherein the hinge pin comprises:
a first flange configured to engage the first hinge element; and
a second flange configured to engage the second hinge element.

2. The apparatus of claim 1, wherein when heated by the first heating element, the first shape memory alloy element is configured to apply a torque in a first direction to the hinge pin and to the second hinge element via the second flange.

3. The apparatus of claim 2, further comprising:
a second shape memory alloy element disposed coaxially within the bore of the hinge pin; and
a second heating element disposed coaxially within the bore of the hinge pin and configured to heat the second shape memory alloy element.

4. The apparatus of claim 3, wherein when heated by the second heating element, the second shape memory alloy element is configured to apply a torque in a second direction, opposite the torque in the first direction, to the hinge pin and to the second hinge element via the second flange.

5. The apparatus of claim 2, further comprising a biasing element attached to the first hinge element and the second hinge element and configured to apply a torque in a second direction to the second hinge element, opposite the torque in the first direction.

6. The apparatus of claim 5, wherein the biasing element comprises a spring.

7. The apparatus of claim 5, wherein:
the biasing element comprises a second shape memory alloy element, and
the apparatus further comprises a second heating element configured to heat the second shape memory alloy element and cause it to apply the torque in the second direction.

8. The apparatus of claim 2, further comprising:
a controller configured to control the first heating element; and
a sensor configured to measure a rotation angle of the second hinge element relative to the first hinge element.

9. The apparatus of claim 1, further comprising a locking mechanism configured to lock the second hinge element in one or more fixed positions.

10. The apparatus of claim 1, wherein the movable element comprises an air inlet door of an aircraft system.

11. The apparatus of claim 10, wherein the aircraft system comprises a nitrogen generation system.

12. A movable element actuation system, comprising:
a movable element; and
a hinge actuator, wherein the hinge actuator comprises:
a first hinge element configured to engage and secure to a fixed element;
a second hinge element configured to engage and secure to the movable element and to pivot about an axis of rotation defined by a hinge pin passing through at least one bore of the first hinge element and at least one bore of the second hinge element; and
a first shape memory alloy element disposed coaxially within a bore of the hinge pin; and
a first heating element disposed coaxially within the bore of the hinge pin and configured to heat the first shape memory alloy element,
wherein the hinge pin comprises:
a first flange configured to engage the first hinge element; and
a second flange configured to engage the second hinge element.

13. A method of controlling a position of a movable element, comprising:
heating a first shape memory alloy element of a hinge actuator with a first heating element, wherein the hinge actuator comprises:
a first hinge element configured to engage and secure to a fixed element;
a second hinge element configured to engage and secure to the movable element and to pivot about an axis of rotation defined by a hinge pin passing through at least one bore of the first hinge element and at least one bore of the second hinge element, wherein:
the first shape memory alloy element is disposed coaxially within a bore of the hinge pin,
the first heating element is disposed coaxially within the bore of the hinge pin, and
the hinge pin comprises a first flange configured to engage the first hinge element and a second flange configured to engage the second hinge element;
pivoting the second hinge element about the axis of rotation defined by the hinge pin; and
moving the movable element connected to the hinge actuator.

14. The method of claim 13, wherein when heated by the first heating element, the first shape memory alloy element applies a torque in a first direction to the hinge pin and to the second hinge element via the second flange.

15. The method of claim 14, further comprising heating a second shape memory alloy element of the hinge actuator with a second heating element, wherein:
the second shape memory alloy element is disposed coaxially within the bore of the hinge pin; and
the second heating element is disposed coaxially within the bore of the hinge pin.

16. The method of claim 15, wherein when heated by the second heating element, the second shape memory alloy element applies a torque in a second direction, opposite the torque in the first direction, to the hinge pin and to the second hinge element via the second flange.

17. The method of claim 14, wherein the hinge actuator further comprises a biasing element attached to the first hinge element and the second hinge element and the biasing element is configured to apply a torque in a second direction to the second hinge element, opposite the torque in the first direction.

18. The method of claim 17, wherein the biasing element comprises a spring.

19. The method of claim 17, wherein:
the biasing element comprises a second shape memory alloy element, and
the hinge actuator further comprises a second heating element configured to heat the second shape memory alloy element and cause it to apply the torque in the second direction.

20. The method of claim 14, further comprising:
controlling the first heating element using a controller; and
measuring a rotation angle of the second hinge element relative to the first hinge element using a sensor.

* * * * *